US012670391B2

(12) United States Patent
Jang et al.

(10) Patent No.: US 12,670,391 B2
(45) Date of Patent: Jun. 30, 2026

(54) METHOD AND APPARATUS WITH OBJECT ESTIMATION MODEL TRAINING

(71) Applicant: SAMSUNG ELECTRONICS CO., LTD., Suwon-si (KR)

(72) Inventors: Sujin Jang, Suwon-si (KR); Dae Ung Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 18/340,996

(22) Filed: Jun. 26, 2023

(65) Prior Publication Data

US 2024/0211749 A1      Jun. 27, 2024

(30) Foreign Application Priority Data

Dec. 27, 2022      (KR) ......................... 10-2022-0186069

(51) Int. Cl.
*G06N 3/08* (2023.01)

(52) U.S. Cl.
CPC ..................................... *G06N 3/08* (2013.01)

(58) Field of Classification Search
CPC ........... G06N 3/08; G06N 3/088; G06N 3/045
USPC .......................................................... 706/25
See application file for complete search history.

(56) References Cited

U.S. PATENT DOCUMENTS

| | | | |
|---|---|---|---|
| 11,181,637 B2 | 11/2021 | Gatland et al. | |
| 11,308,350 B2 * | 4/2022 | Habibian | G06V 10/82 |
| 11,350,078 B2 * | 5/2022 | Tang | H04N 13/275 |
| 12,236,665 B2 * | 2/2025 | Choi | G06V 10/762 |
| 2018/0129906 A1 * | 5/2018 | Habibian | G06V 10/82 |
| 2018/0268203 A1 * | 9/2018 | Sohn | G08B 13/19613 |
| 2020/0064471 A1 * | 2/2020 | Gatland | H04N 13/388 |
| 2021/0314551 A1 * | 10/2021 | Tang | G06V 10/764 |
| 2022/0172046 A1 * | 6/2022 | Nishiyuki | G06N 3/045 |
| 2022/0180193 A1 | 6/2022 | Caine et al. | |
| 2022/0180199 A1 * | 6/2022 | Xu | G06N 3/0495 |
| 2022/0237890 A1 * | 7/2022 | Choi | G06N 3/094 |
| 2023/0072334 A1 * | 3/2023 | Kashimoto | G06N 3/0895 |

FOREIGN PATENT DOCUMENTS

| | | |
|---|---|---|
| CN | 113920307 A | 1/2022 |
| JP | 2021-117130 A | 8/2021 |
| KR | 10-2021-0090384 A | 7/2021 |

OTHER PUBLICATIONS

Wang, Yue, et al. "DETR3D: 3D object detection from multi-view images via 3D-to-2D queries." *Conference on Robot Learning.* PMLR, 2022. pp. 1-12.

(Continued)

*Primary Examiner* — Pritham D Prabhakher
(74) *Attorney, Agent, or Firm* — NSIP Law

(57) ABSTRACT

A method and apparatus with object estimation model training is provided. The method include generating a cross-correlation loss based on a first feature vector, generated using an interim first neural network (NN) model provided an input based on first input data about a target object, and a second feature vector generated using a trained second neural network provided another input based on second input data about the target object; and generating a trained first NN model, including training the interim first NN model based on the cross-correlation loss.

18 Claims, 5 Drawing Sheets

(56)     References Cited

OTHER PUBLICATIONS

Reading, Cody, et al. "Categorical depth distribution network for monocular 3D object detection." *Proceedings of the IEEE/CVF Conference on Computer Vision and Pattern Recognition*. 2021. pp. 8555-8564.

Wang, Yan, et al. "Pseudo-LiDAR from visual depth estimation: Bridging the gap in 3D object detection for autonomous driving." *Proceedings of the IEEE/CVF Conference on Computer Vision and Pattern Recognition*. 2019. pp. 8445-8453.

Vora, Sourabh, et al. "Pointpainting: Sequential fusion for 3D object detection." *Proceedings of the IEEE/CVF conference on computer vision and pattern recognition*. 2020. pp. 4604-4612.

Shi, Shaoshuai, et al. "Pointrenn: 3D object proposal generation and detection from point cloud." *Proceedings of the IEEECVF conference on computer vision and pattern recognition*. 2019. pp. 770-779.

Bai, Xuyang, et al. "Transfusion: Robust lidar-camera fusion for 3D object detection with transformers." *Proceedings of the IEEE/CVF Conference on Computer Vision and Pattern Recognition*. 2022. pp. 1090-1099.

Yin, Tianwel, et al. "Center-based 3D object detection and tracking." *Proceedings of the IEEE/CVF conference on computer vision and pattern recognition*. 2021. pp. 11784-11793.

Xie, Enze, et al. "M²BEV: Multi-camera joint 3D detection and segmentation with unified birds-eye view representation." *arXiv preprint arXiv:2204.05088* (Apr. 19, 2022). pp. 1-21.

Deng, Jiajun, et al. "Voxel R-CNN: Towards high performance voxel-based 3D object detection." *Proceedings of the AAAI Conference on Artificial Intelligence*. vol. 35. No. 2. May 18, 2021. pp. 1201-1209.

* cited by examiner

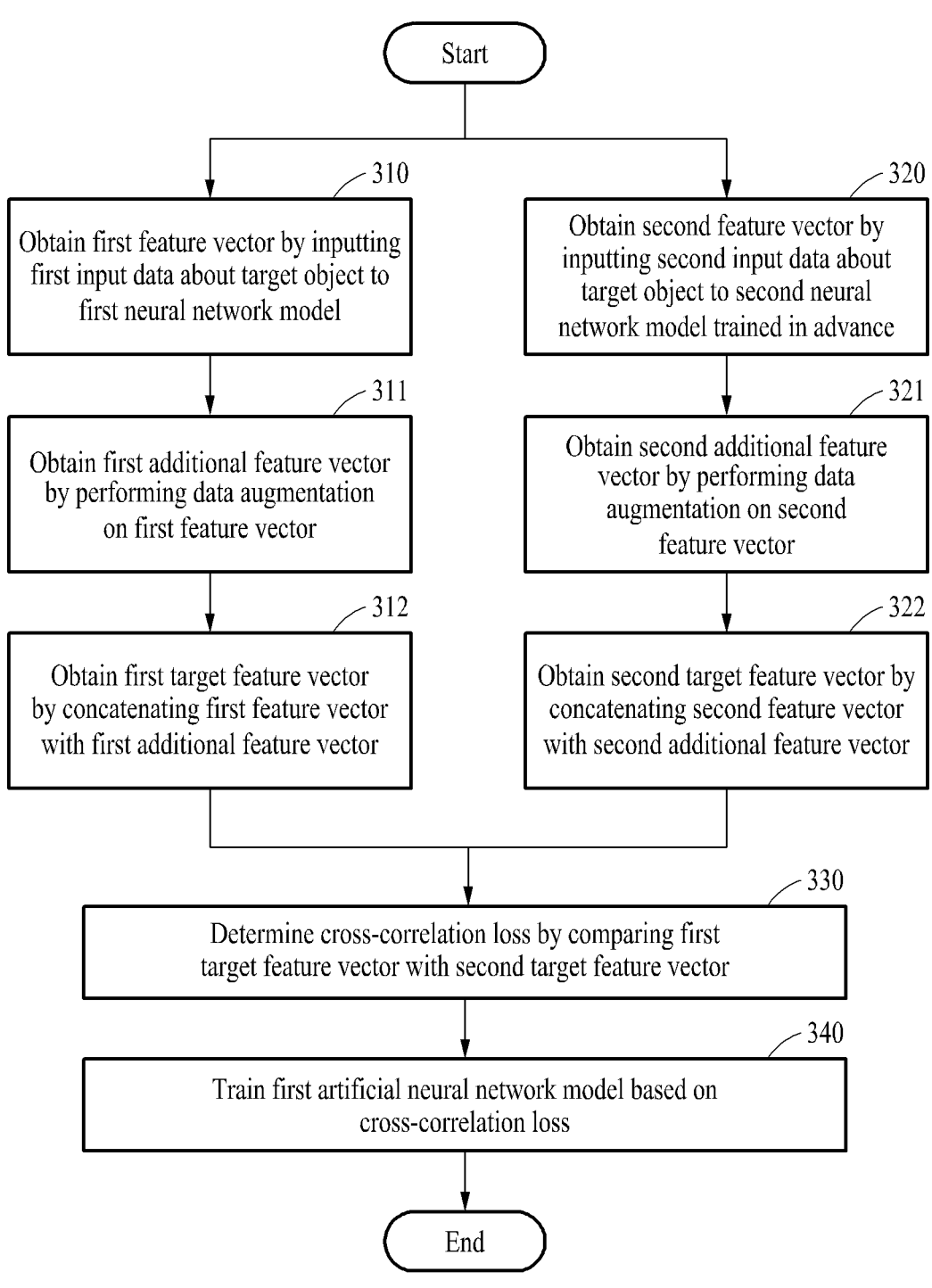

Start

310
Obtain first feature vector by inputting first input data about target object to first neural network model 311
Obtain first additional feature vector by performing data augmentation on first feature vector 312
Obtain first target feature vector by concatenating first feature vector with first additional feature vector 320
Obtain second feature vector by inputting second input data about target object to second neural network model trained in advance 321
Obtain second additional feature vector by performing data augmentation on second feature vector 322
Obtain second target feature vector by concatenating second feature vector with second additional feature vector 330
Determine cross-correlation loss by comparing first target feature vector with second target feature vector 340
Train first artificial neural network model based on cross-correlation loss End

FIG. 3

METHOD AND APPARATUS WITH OBJECT ESTIMATION MODEL TRAINING

CROSS-REFERENCE TO RELATED APPLICATIONS

This application claims the benefit under 35 USC § 119(a) of Korean Patent Application No. 10-2022-0186069, filed on Dec. 27, 2022, in the Korean Intellectual Property Office, the entire disclosure of which is incorporated herein by reference for all purposes.

BACKGROUND

1. Field

The following description relates to a method and an apparatus with object estimation model training.

2. Description of Related Art

Three-dimensional (3D) object detection technology is often used in advanced driver assistance systems (ADAS). For example, the 3D object detection technology may be used in front facing cameras, multi-cameras, and surround view monitors (SVM). In addition, the 3D object detection technology may serve as a detection function for detecting an exact location (a 3D location of a vehicle reference object) and classification information (e.g., pedestrians, vehicles, traffic lights, etc.) of objects around an autonomous vehicle, and for determining optimal driving paths.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a cross-correlation loss based on a first feature vector, generated using an interim first neural network (NN) model provided an input based on first input data about a target object, and a second feature vector generated using a trained second neural network provided another input based on second input data about the target object; and generating a trained first NN model, including training the interim first NN model based on the cross-correlation loss.

The method may include an example in which a first data capture modality of the first input data is different from a second data capture modality of at least some of the second input data.

The first input data may include at least one image of the target object, and the second input data may include at least one of point cloud data of the target object obtained from a lidar sensor or multi-modal data obtained from a plurality of modalities.

The determining of the cross-correlation loss may include determining a first cross-correlation loss based on a similarity of direction information between the first feature vector and the second feature vector; determining a second cross-correlation loss based on a similarity of size information between the first feature vector and the second feature vector; and determining the cross-correlation loss by weighted-summing the first cross-correlation loss and the second cross-correlation loss.

The interim first NN model may include a feature vector extractor and a detection head, and the training of the interim first NN model includes training the feature vector extractor so that the cross-correlation loss is minimized.

The training of the interim first NN model may include performing unsupervised training of the interim first NN model without label information corresponding to the first input data.

The method may further include obtaining a first additional feature vector by augmenting data of the first feature vector; obtaining a second additional feature vector by augmenting data of the second feature vector; obtaining a first target feature vector by concatenating the first feature vector with the first additional feature vector; and obtaining a second target feature vector by concatenating the second feature vector with the second additional feature vector, wherein the determining of the cross-correlation loss includes determining the cross-correlation loss by comparing the first target feature vector with the second target feature vector.

The obtaining of the first additional feature vector may include obtaining the first additional feature vector by applying at least one of a dropout layer, in the interim first NN model, or random Gaussian noise to the first feature vector, and the obtaining of the second additional feature vector may include obtaining the second additional feature vector through use of at least one of a dropout layer, of the second NN model, or through application of random Gaussian noise to the second feature vector.

The method may further include obtaining first additional input data by augmenting data of the first input data; obtaining a first additional feature vector by inputting the first additional input data to the interim first NN model; obtaining second additional input data by augmenting data of the second input data; obtaining a second additional feature vector by inputting the second additional input data to the second NN model; obtaining a first target feature vector by concatenating the first feature vector with the first additional feature vector; and obtaining a second target feature vector by concatenating the second feature vector with the second additional feature vector, wherein the determining of the cross-correlation loss includes determining the cross-correlation loss by comparing the first target feature vector with the second target feature vector.

In another general aspect, an electronic device includes one or more processors configured to execute instructions; and one or more memories storing the instructions, wherein the execution of the instructions by the one or more processors configures the one or more processors to generate a cross-correlation loss based on a first feature vector, generated using an interim first neural network (NN) model provided an input based on first input data about a target object, and a second feature vector generated using a trained second NN model provided another input based on second input data about the target object; and generate a trained first NN model, including training the interim first NN model based on the cross-correlation loss.

The first input data may include at least one image of the target object captured by a camera, and the second input data includes at least one of point cloud data of the target object obtained from a lidar sensor or multi-modal data obtained from a plurality of modalities.

The electronic device may be is vehicle, and may further include the camera and the lidar sensor.

For the generation of the cross-correlation loss, the one or more processors may be configured to determine a first cross-correlation loss based on a similarity of direction information between the first feature vector and the second feature vector; determine a second cross-correlation loss based on a similarity of size information between the first feature vector and the second feature vector; and determine the cross-correlation loss by weighted-summing the first cross-correlation loss and the second cross-correlation loss.

The interim first NN model may include a feature vector extractor and a detection head, and for the training of the interim first NN model, the one or more processors may be configured to train the feature vector extractor toward minimization of the cross-correlation loss.

For the training of the interim first NN model, the one or more processors may be configured to perform unsupervised training of the interim first NN model without label information corresponding to the first input data.

The one or more processors may be configured to obtain a first additional feature vector by augmenting data of the first feature vector; obtain a second additional feature vector by augmenting data of the second feature vector; obtain a first target feature vector by concatenating the first feature vector with the first additional feature vector; and obtain a second target feature vector by concatenating the second feature vector with the second additional feature vector. For the generation of the cross-correlation loss, the one or more processors may be configured to determine a cross-correlation loss by comparing the first target feature vector with the second target feature vector.

The one or more processors may be configured to obtain the first additional feature vector by applying at least one of a dropout layer, in the interim first NN model, or random Gaussian noise to the first feature vector; and obtain the second additional feature vector by applying at least one of a dropout layer, of the second NN model, or through application of random Gaussian noise to the second feature vector.

The one or more processors may be configured to obtain first additional input data by augmenting data of the first input data; obtain a first additional feature vector by inputting the first additional input data to the interim first NN model; obtain second additional input data by augmenting data of the second input data; obtain a second additional feature vector by inputting the second additional input data to the second NN model; obtain a first target feature vector by concatenating the first feature vector with the first additional feature vector; and obtain a second target feature vector by concatenating the second feature vector with the second additional feature vector. For the generation of the cross-correlation lass, the one or more processors are configured to determine the cross-correlation loss by comparing the first target feature vector with the second target feature vector.

In another general aspect, an electronic device includes one or more sensors; one or more processors configured to execute instructions; and one or more memories storing the instructions, wherein the execution of the instructions by the one or more processors configures the one or more processors to estimate the target object based on at least one image captured by an image sensor of the one or more sensors; obtain a first feature vector by inputting the at least one image to a feature vector extractor of a first neural network (NN) model; and estimate the target object by inputting the first feature vector to a detection head of the first NN model, wherein the first NN model is a NN model having been trained based on a second NN model trained based on a modality different from the image sensor.

The first NN model may include a camera-based three-dimensional (3D) object estimation detector, and wherein the camera-based 3D object estimation detector is configured to estimate 3D location/posture and classification information of the target object using a feature extraction network model that estimates 3D geometric information of the target object around an adjacent object from the at least one image obtained from the one or more sensors.

The second NN model may include at least one of a lidar modal-based 3D object estimation detector or a multi-modal based 3D object estimation detector, wherein the lidar modal-based 3D object estimation detector is configured to estimate 3D location information of the target object using point cloud data, and wherein the multi-modal based 3D object estimation detector is configured to estimate the 3D location information of the target object using the one or more sensors.

Other features and aspects will be apparent from the following detailed description, the drawings, and the claims.

BRIEF DESCRIPTION OF THE DRAWINGS

FIG. 3 illustrates an example method with data augmentation according to one or more embodiments.

Figure 1:
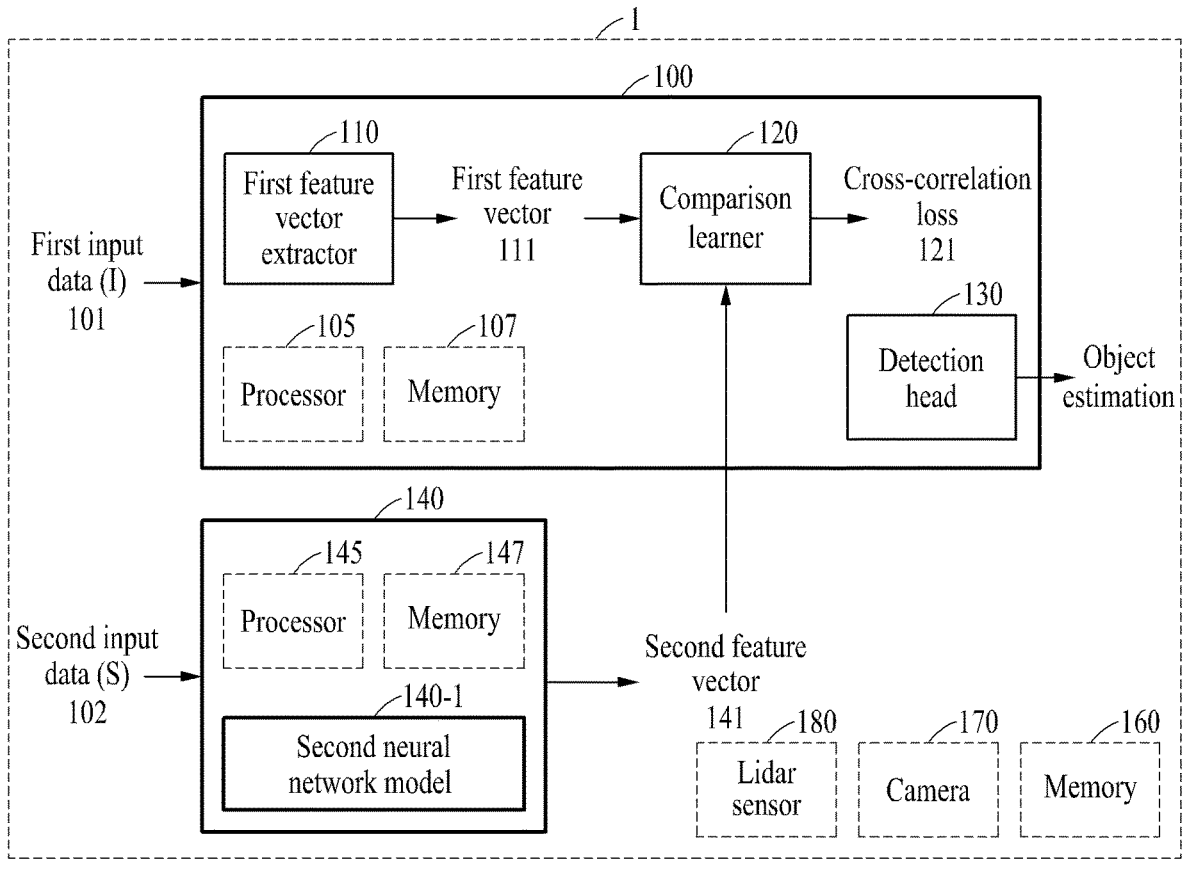
FIG. 1 illustrates an example electronic device or system with object estimation model training according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

FIG. 1 illustrates an example electronic device or system with object estimation model training according to one or more embodiments.

In FIG. 1, one or more blocks and a combination thereof may be implemented by a special-purpose hardware-based computer that performs a predetermined function, or a combination of computer instructions and special-purpose hardware.

Referring to FIG. 1, an electronic device or system 1 includes a first computing apparatus 100, a second computing apparatus 140, and a memory 160.

The first and second computing apparatuses 100 and 140 may each be, or included in, a personal computer (PC), a data server, a portable device, or an advanced driver assistance system (ADAS), or the electronic device 1 may be the PC, the data server, the portable device, or a vehicle with the ADAS system (e.g., a corresponding electronic control unit (ECU) of the vehicle, where the ADAS may also include other components of the ADAS such as multimodal sensors, as described herein. The portable device may be, as non-limiting examples, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be a smart watch, a smart band, a smart ring, or the like.

The electronic device 1 may include one or more processors (such as represented by computing apparatuses 100 and 140, e.g., where the first computing apparatus 100 may be the processor 105, or the combination of the processor 105 and memory 107, configured to perform operations discussed herein with respect to computing apparatus 100, and where the second computing apparatus 140 may be the processor 145, or the combination of the processor 145 and memory 147, configured to perform operations discussed herein with respect to computing apparatus 140) configured to execute instructions, and one or more memories (e.g., memory 160 or respective memories 107 and 147) storing the instructions. The execution of the instructions by the one or more processors may configure the one or more processors to perform any one or any combinations of operations/ methods described herein. In an example the electronic device or system 1 is a vehicle and the first and/or second computing apparatus may be components of the vehicle or components separate from the vehicle.

As shown in FIG. 1, the first computing apparatus 100 may include a first feature vector extractor 110, a comparison learner 120, and a detection head 130.

In an example, the first computing apparatus 100 may include a first neural network (NN) model, which generally is a type of machine learning model having a problem-solving or other inference capability. The first NN model may be configured to perform a neural network operation using an accelerator. In an example, the first computing apparatus 100 may be, or exterior or interior of, the accelerator. As non-limiting examples, the accelerator may include a neural processing unit (NPU), a graphics processing unit (GPU), a field-programmable gate array (FPGA), an application-specific integrated circuit (ASIC), or an application processor (AP), any or any combination of which are represented by the processor 105. Alternatively, the accelerator may be implemented as a software computing environment, such as a virtual machine or the like.

In an example, the second computing apparatus 140 may include a second neural network (NN) model 140-1, which generally is a type of machine learning model having a problem-solving or other inference capability. The second NN model may be configured to perform a neural network operation using an accelerator. In an example, the second computing apparatus 140 may be, or exterior or interior of, the accelerator. As non-limiting examples, the accelerator may include a neural processing unit (NPU), a graphics processing unit (GPU), a field-programmable gate array (FPGA), an application-specific integrated circuit (ASIC), or an application processor (AP), any or any combination of which are represented by the processor 145. Alternatively, the accelerator may be implemented as a software computing environment, such as a virtual machine or the like.

In an example, the first NN model may include a camera-based three-dimensional (3D) object estimation network model (hereinafter, referred to as a camera model) or a camera modal-based 3D object estimation detector. The first NN model may include the first feature vector extractor 110, the comparison learner 120, and the detection head 130 and may train the first feature vector extractor 110 toward a minimization of a cross-correlation loss 121.

A camera modal-based 3D object estimation detector may estimate 3D location/posture and classification information of an object using a feature extraction network that estimates 3D geometric information of an object around a vehicle from an image obtained from a camera sensor 170.

The first feature vector extractor 110 may obtain a first feature vector 111 by receiving first input data I 101. The first input data I 101 may include at least one image of an object. The first feature vector 111 may include a feature map representing geometric information of a target object to be detected.

The first feature vector extractor 110 may perform supervised learning or unsupervised learning. The supervised learning may include that 3D object information (e.g., vehicle/pedestrian location, posture, or size information) is given in the form of a label in input data. The unsupervised learning may perform learning without using 3D object information without the labels of input data.

The first computing apparatus 100 may be configured to obtain at least one first additional feature vector by augmenting data on the first feature vector 111. In an example, the first computing apparatus 100 may obtain the first additional feature vector by applying at least one of a dropout layer or random Gaussian noise to the first feature vector 111.

A second computing apparatus 140 may obtain a second feature vector 141 by receiving second input data S 102. The second input data S 102 may include at least one of point cloud data obtained from a lidar sensor or multi-modal data obtained from a plurality of modalities.

The second computing apparatus 140 may include a second NN model 140-1 having a problem-solving or other inference capability. The second NN model 140-1 may include a lidar modal-based 3D object estimation network model (hereinafter, referred to as a lidar model) or a lidar modal-based 3D object estimation detector, using multiple sensors. The second NN model 140-1 may also include a multi-modal network model (hereinafter, referred to as a multi-modal model) or a multi-modal based 3D object estimation detector, using multiple sensors. The second feature vector 141 may include a feature map representing rich geometric information of a target object to be detected. In an example, the first and second devices 100 and 140 may be respective electronic control units (ECUs) when the electronic device 1 is a vehicle.

A lidar modal-based 3D object estimation detector may estimate 3D location information (a 3D location, size, and posture of an object) of an object around a vehicle using point cloud data obtained from the lidar sensor 180. The 3D location/posture and classification information of a target object may be estimated using a neural network model that extracts geometric information from the point cloud.

A multi-modal based 3D object estimation detector may estimate the 3D location/posture and classification information of an object using multiple sensors, such as a lidar sensor, a camera, or a radar.

The term "multi-modal" may refer to an environment that interacts with computers in many forms and meanings. In addition, the "modal" (modality) may refer to a communication channel used in a process of interaction. For example, a keyboard or mouse, which is used to input something to a personal computer (PC), may be referred to as a device for one modality. That is, the "modality" may refer to a 'channel' of human-computer communication in one way. Similarly, in the object estimation model, the modality may mean a method that may train and infer like a human using a camera modality and a lidar sensor modality, etc.

The second computing apparatus 140 may obtain at least one second additional feature vector by performing data augmentation on the second feature vector 141. In an example, the second NN model 140-1 may obtain the second additional feature vector by applying at least one of a dropout layer or random Gaussian noise to the second feature vector 141.

In an example, the comparison learner 120 may determine the cross-correlation loss 121 by comparing the first feature vector 111 with the second feature vector 141. The comparison learner 120 may perform contrastive learning that determines the cross-correlation loss 121.

In an example, the comparison learner 120 may determine the cross-correlation loss 121 by weighted-summing a first cross-correlation loss and a second cross-correlation loss. The comparison learner 120 may use a weight pre-determined experimentally to determine a weight between the first cross-correlation loss and the second cross-correlation loss. Alternatively, the comparison learner 120 may determine the cross-correlation loss 121 by weighted-summing the first cross-correlation loss and the second cross-correlation loss using an arbitrary weight, and then may apply the cross-correlation loss 121 to the first feature vector extractor 110. The first feature vector extractor 110 may update the first feature vector 111 using the cross-correlation loss 121. The comparison learner 120 may obtain the first cross-correlation loss and the second cross-correlation loss based on the updated first feature vector 111. The comparison learner 120 may obtain a new cross-correlation loss by weighted-summing the first cross-correlation loss and the second cross-correlation loss using a new arbitrary weight, and may determine a smaller value among the existing cross-correlation loss and the new cross-correlation loss as the cross-correlation loss 121. The comparison learner 120 may determine a minimum value as the cross-correlation loss 121 by repeating the above-described process.

The detection head 130 may include a practical NN model trained to simulate the second computing apparatus 140 by applying the cross-correlation loss 121 to the first NN model of the first computing apparatus 100. The detection head 130 may obtain a 3D object detection result (e.g., a 3D location/box size, orientation, and object class) from a first input image of a target object. Each of the extractor 110, the comparison learner 120, and the detection head 130 may be representative of processors, or the respective operations may be performed by the processor 105 of the first computing apparatus 100.

Figure 2A:
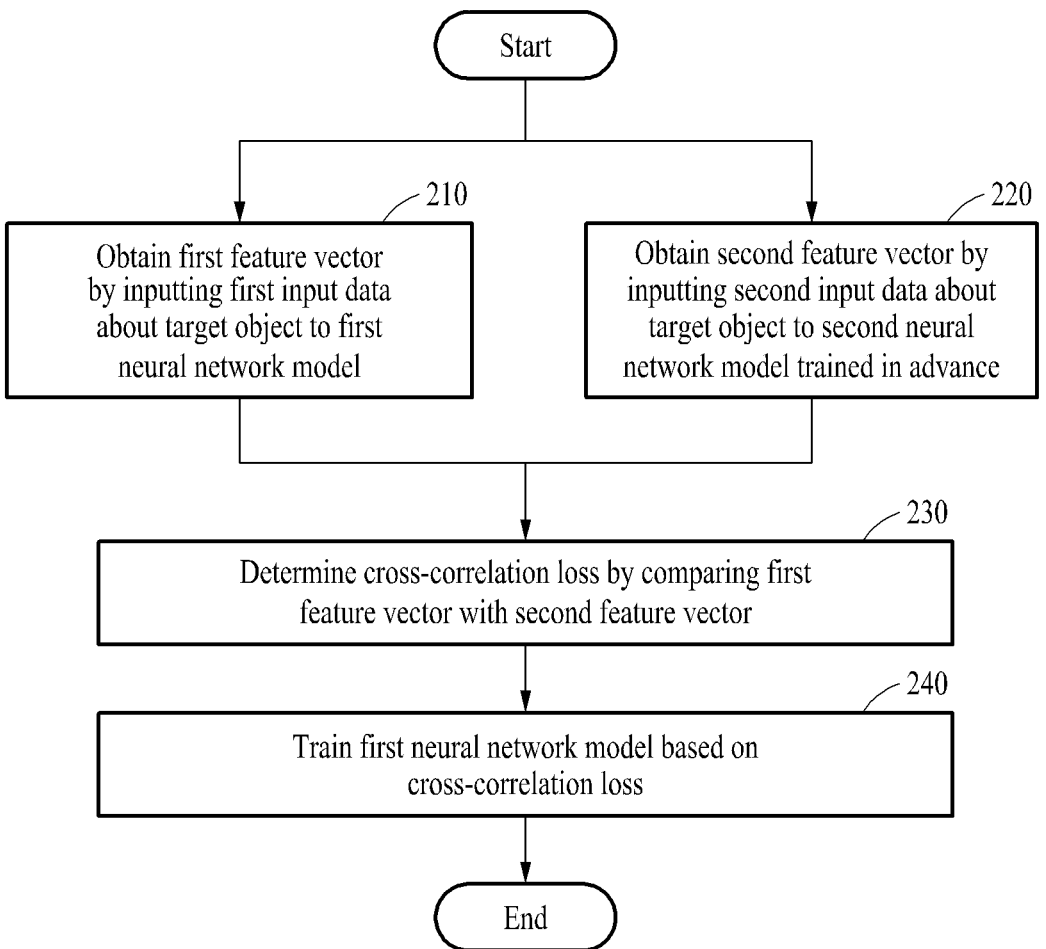
FIG. 2A illustrates an example method with object estimation model training according to one or more embodiments.

FIG. 2A illustrates an example method with object estimation model training according to one or more embodiments.

Figure 2B:
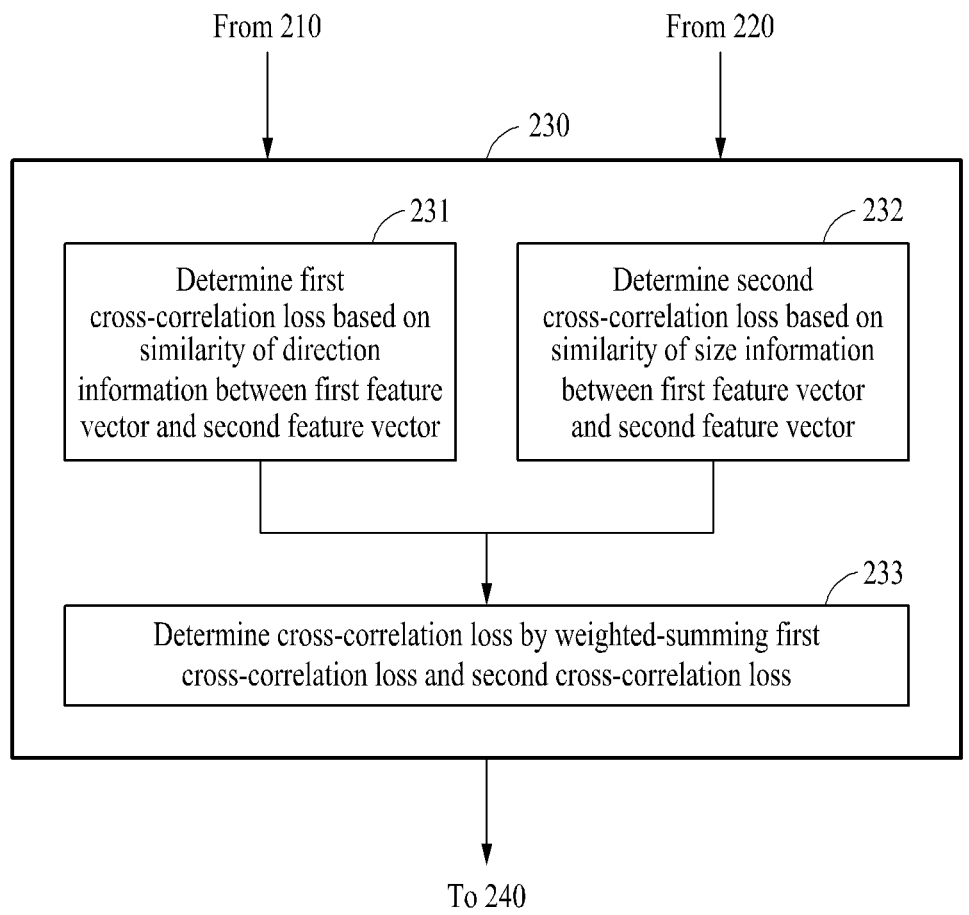
FIG. 2B illustrates an example method with cross-correlation loss determination according to one or more embodiments.

FIG. 2B illustrates an example method with cross-correlation loss determination according to one or more embodiments.

Operations of FIGS. 2A and 2B may be performed in the shown order and manner. However, the order of some operations may be changed, or some operations may be omitted, without departing from the spirit and scope of the shown example. Many of the operations shown in FIGS. 2A and 2B may be performed in parallel, concurrently, or any suitable order that may optimize the operations described in FIGS. 2A and 2B.

For convenience of description, operations 210 through 240 may be described as being performed using the first computing apparatus 100 and the second computing apparatus 140 shown in FIG. 1. However, operations 210 through 240 may be performed by another suitable computing apparatus, electronic device, or a suitable system.

The description provided with reference to FIG. 1 may apply to the description provided with reference to FIGS. 2A and 2B.

In operation 210, the first computing apparatus 100 may be configured to obtain the first feature vector 111 by inputting the first input data I 101 about a target object to the first NN model.

The first input data I 101 may include at least one image obtained from a sensor (e.g., a camera). For example, the first input data I 101 may include an image including a traffic light, a pedestrian around a vehicle or a location/posture of another vehicle. The image may include an image without additional label information.

The first NN model may include a feature vector extractor (e.g., the first feature vector extractor 110 and the detection head 130 of FIG. 1).

In operation 220, the second computing apparatus 140 may be configured to obtain the second feature vector 141 by inputting the second input data S 102 about the target object to the second NN model 140-1 trained in advance.

The second input data S 102 may include at least one of point cloud data obtained from a lidar sensor or multi-modal data obtained from a plurality of modalities. For example, the second input data S 102 may include data, such as a traffic light and a pedestrian around a vehicle or a location/posture of another vehicle. The data may include rich geometric information data.

In operation 230, the first computing apparatus 100 may be configured to determine the cross-correlation loss 121 by comparing the first feature vector 111 with the second feature vector 141. The comparison learner 120 may perform contrastive learning that determines the cross-correlation loss 121.

Referring to FIG. 2B, in operation 231, the first computing apparatus 100 may be configured to determine the first cross-correlation loss based on a similarity of direction information between the first feature vector 111 and the second feature vector 141. The comparison learner 120 may determine the first cross-correlation loss based on the similarity of direction information between the first feature vector 111 and the second feature vector 141.

The comparison learner 120 may determine the first cross-correlation loss based on the similarity of direction information between the first feature vector 111 and the second feature vector 141 in the same manner as in Equation 1 below.

Equation 1

$$L_{CC}(A, B) = (x + a)^n = \sum_i (1 - C_{ii})^2 + \lambda \sum_i \sum_{j \neq i} C_{ij} \quad (1)$$

$$C = A^T \cdot B \quad (2)$$

Equation 1 is an example of the first cross-correlation loss based on a similarity of direction information between different modalities. A is defined as a constant to control a process of determining the first cross-correlation loss according to the similarity of direction information. A is defined as a feature vector generated through a concat operation of the first feature vector 111 and the first additional feature vector as shown in Equation 3 below and B is defined as a feature vector generated through a concat operation of the second feature vector 141 and the second additional feature vector. A matrix C is calculated through a matrix multiplication operation of a feature vector A and a feature vector B. In Equation 1, $C_{ii}$ denotes diagonal elements of the matrix C and $C_{ij}$ denotes elements other than the diagonal elements of the matrix C.

In operation 232, the first computing apparatus 100 may determine the second cross-correlation loss based on a similarity of size information between the first feature vector 111 and the second feature vector 141. The comparison learner 120 may determine the second cross-correlation loss based on the similarity of size information between the first feature vector 111 and the second feature vector 141.

The comparison learner 120 may determine the second cross-correlation loss based on the similarity of size information between the first feature vector 111 and the second feature vector 141 in the same manner as in Equation 2 below.

Equation 2

$$L_{ems}(A, B) = \|\text{logits} - \text{target}\|,$$

$$\text{where logits} = e^{-\left(\|A\|_2^2 + \|B\|_2^2 - 2A \cdot B^T\right)/\tau}, \text{target} = \text{logits} = e^{-\left(\|B\|_2^2 + \|B^T\|_2^2 - 2B \cdot B^T\right)/\tau}$$

In Equation 2, T is defined as a constant to control a process of determining the second cross-correlation loss according to the similarity of size information. Similar to Equation 1 above, A is defined as a feature vector generated through a concat operation of the first feature vector 111 and the first additional feature vector and B is defined as a feature vector generated through a concat operation of the second feature vector 141 and the second additional feature vector. $\|\cdot\|_2$ denotes $L_2$-Norm. The $L_2$-Norm denotes a value rooted for the sum of squares of each component.

In operation 233, the first computing apparatus 100 may be configured to determine the cross-correlation loss 121 by weighted-summing the first cross-correlation loss and the second cross-correlation loss. In an example, the comparison learner 120 may determine the cross-correlation loss 121 by weighted-summing the first cross-correlation loss and the second cross-correlation loss.

In an example, the comparison learner 120 may allow the first feature vector 111 and the first additional feature vector of the first computing apparatus 100 to simulate the cross-correlation between the second feature vector 141 and the second additional feature vector of the second computing apparatus 140.

In operation 240, the first computing apparatus 100 may be configured to train the first NN model based on the cross-correlation loss 121. The comparison learner 120 may apply the cross-correlation loss 121 for reinforcing differential feature information to the first feature vector extractor 110. The first computing apparatus 100 may train the first feature vector extractor 110 so that the cross-correlation loss 121 is minimized. The first computing apparatus 100 may train the first NN model without label information corresponding to the first input data I 101.

FIG. 3 illustrates an example method with data augmentation according to one or more embodiments.

Referring to FIG. 3, an electronic device (e.g., including the first and second computing apparatuses 100 and 140) may be configured to perform operations 310 through 340 in the shown order and manner. However, the order of some operations may be changed, or some operations may be omitted, without departing from the spirit and scope of the shown example. Many of the operations shown in FIG. 3 may be performed in parallel, concurrently, or in any suitable order that may optimize the method with data augmentation.

For convenience of description, operations 310 through 340 may be described as being performed using the first computing apparatus 100 and the second computing apparatus 140 shown in FIG. 1. However, operations 310 through 340 may be performed by another suitable electronic device or a suitable system.

The description provided with reference to FIGS. 1 through 2B may apply to the description provided with reference to FIG. 3.

In operation 310, the first computing apparatus 100 may be configured to obtain the first feature vector 111 by inputting the first input data I 101 about a target object to the first NN model.

In operation 311, the first computing apparatus 100 may be configured to obtain the first additional feature vector by augmenting data on the first feature vector 111.

In operation 312, the first computing apparatus 100 may be configured to obtain a first target feature vector by concatenating the first feature vector 111 with the first additional feature vector.

In operation 320, the second computing apparatus 140 may be configured to obtain the second feature vector 141 by inputting the second input data S 102 about the target object to the second NN model 140-1 trained in advance.

In operation 321, the second computing apparatus 140 may be configured to obtain the second additional feature vector by augmenting data on the second feature vector 141.

The first target feature vector and a second target feature vector may be obtained in the same manner as in Equation 3 below.

Equation 3

$$L_{cl}\left(F_I \odot \tilde{F}_I, F_P \odot \tilde{F}_P\right),$$

In Equation 3, $F_I$ denotes the first feature vector 111, $\tilde{F}_I$ denotes the first additional feature vector, $F_P$ denotes the second feature vector 141, $\tilde{F}_P$ denotes the second additional feature vector, and $\odot$ denotes a concat (i.e., a concatenation operation).

In operation 322, the second computing apparatus 140 may be configured to obtain the second target feature vector by concatenating the second feature vector 141 with the second additional feature vector.

In operation 330, the first computing apparatus 100 may be configured to determine the cross-correlation loss 121 by comparing the first target feature vector with the second target feature vector.

In an example, the comparison learner 120 may determine the first cross-correlation loss based on a similarity of direction information between the first target feature vector and the second target feature vector in the same manner as in Equation 1 above-described.

In an example, the comparison learner 120 may determine the second cross-correlation loss based on the similarity of size information between the first target feature vector and the second target feature vector in the same manner as in Equation 2 above-described.

In an example, the comparison learner 120 may determine the cross-correlation loss 121 by weighted-summing the first cross-correlation loss and the second cross-correlation loss.

In an example, the comparison learner 120 may allow first additional feature vectors of the first object estimation model computing apparatus 100 to simulate the cross-correlation between second additional feature vectors of the second object estimation model computing apparatus 140.

In operation 340, the first computing apparatus 100 may be configured to train the first NN model based on the cross-correlation loss 121. In an example, the comparison learner 120 may apply the cross-correlation loss 121 to reinforce differential feature information to the first feature vector extractor 110.

Figure 4:
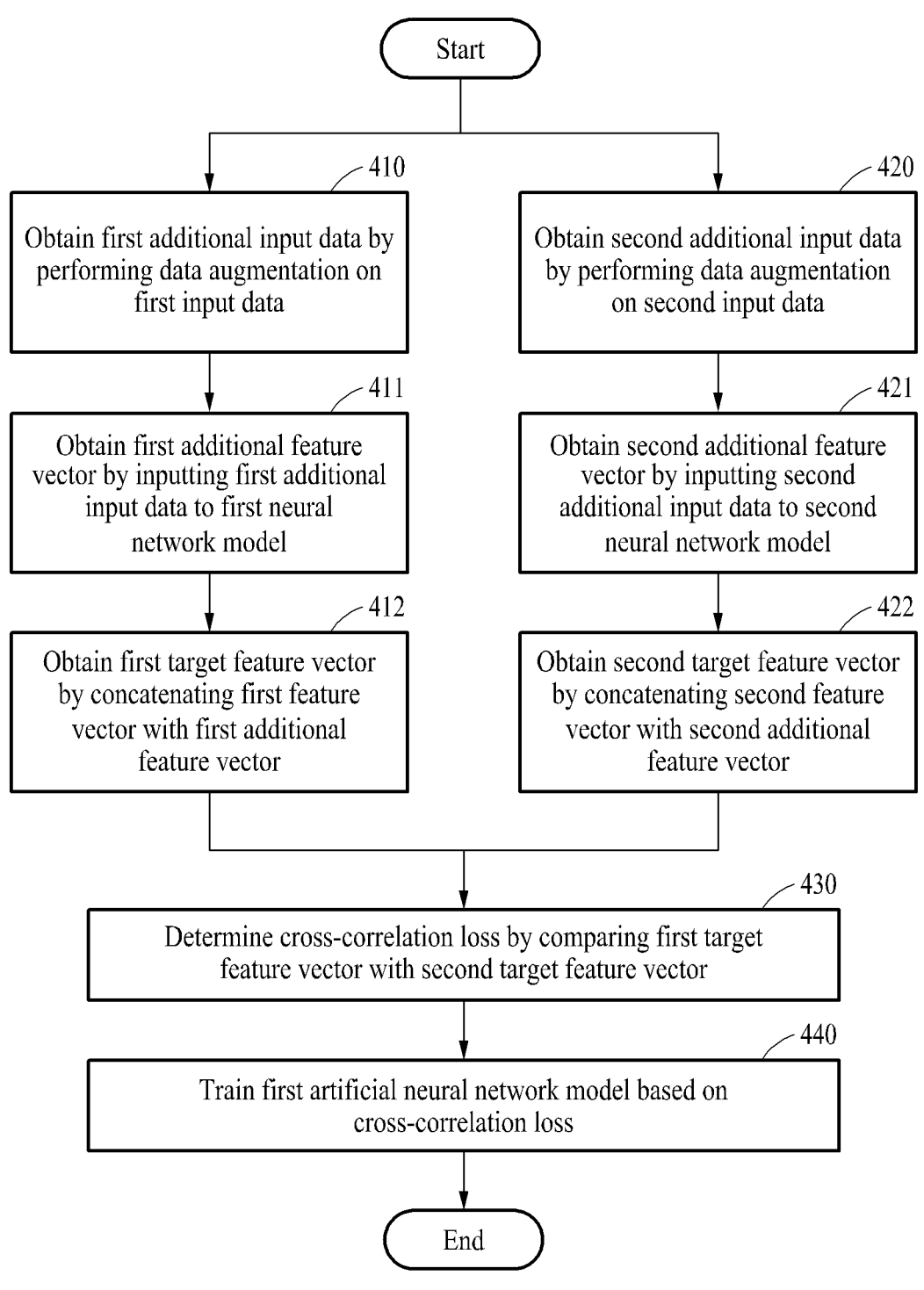
FIG. 4 illustrates an example method with data augmentation according to one or more embodiments.

FIG. 4 illustrates an example method with data augmentation according to one or more embodiments.

Referring to FIG. 4, an electronic device (e.g., including the first and second computing apparatuses 100 and 140) may be configured to perform operations 410 through 440 in the shown order and manner. However, the order of some operations may be changed, or some operations may be omitted, without departing from the spirit and scope of the shown example. Many of the operations shown in FIG. 4 may be performed in parallel, concurrently, or in any suitable order that may optimize the method with data augmentation.

For convenience of description, operations 410 through 440 may be described as being performed using the first computing apparatus 100 and the second computing apparatus 140 shown in FIG. 1. However, operations 410 through 440 may be performed by another suitable electronic device or a suitable system.

The description provided with reference to FIGS. 1 through 3 may apply to the description provided with reference to FIG. 4.

In operation 410, the first computing apparatus 100 may be configured to obtain first additional input data by performing data augmentation on the first input data I 101. The first additional input data may be obtained by applying at least one of a dropout layer or random Gaussian noise to an image obtained from a camera.

In operation 411, the first computing apparatus 100 may be configured to obtain the first additional feature vector by inputting the first additional input data to the first NN model.

In operation 412, the first computing apparatus 100 may be configured to obtain the first target feature vector by concatenating the first feature vector 111 with the first additional feature vector.

In operation 420, the second computing apparatus 140 may obtain second additional input data by augmenting data on the second input data S 102. The second additional input data may be obtained by applying at least one of a dropout layer or random Gaussian noise to point cloud data obtained from a lidar sensor and multi-modal data obtained from a plurality of modalities.

In operation 421, the second computing apparatus 140 may be configured to obtain the second additional feature vector by inputting the second additional input data to the second ANN model 140-1.

In operation 422, the second computing apparatus 140 may be configured to obtain the second target feature vector by concatenating the second feature vector 141 with the second additional feature vector.

In operation 430, the first computing apparatus 100 may be configured to determine the cross-correlation loss 121 by comparing the first target feature vector with the second target feature vector.

In operation 440, the first computing apparatus 100 may be configured to train the first NN model based on the cross-correlation loss 121.

In operations 410 through 440, the method of obtaining additional feature vectors and determining the cross-correlation loss 121 by the computing apparatus may refer to the descriptions of FIGS. 1 through 3 above-described.

The processors, memories, computing apparatuses, electronic devices, cameras, Lidar sensors, and other apparatuses, devices, and components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
generating a cross-correlation loss based on a first feature vector, generated using an interim first neural network (NN) model provided an input based on first input data about a target object, and a second feature vector generated using a trained second neural network provided another input based on second input data about the target object; and generating a trained first NN model, including training the interim first NN model based on the cross-correlation loss,
wherein the determining of the cross-correlation loss comprises:
determining a first cross-correlation loss based on a similarity of direction information between the first feature vector and the second feature vector;
determining a second cross-correlation loss based on a similarity of size information between the first feature vector and the second feature vector; and
determining the cross-correlation loss by weighted-summing the first cross-correlation loss and the second cross-correlation loss.

2. The method of claim 1, wherein a first data capture modality of the first input data is different from a second data capture modality of at least some of the second input data.

3. The method of claim 1,
wherein the first input data comprises at least one image of the target object, and
wherein the second input data comprises at least one of point cloud data of the target object obtained from a lidar sensor or multi-modal data obtained from a plurality of modalities.

4. The method of claim 1,
wherein the interim first NN model comprises a feature vector extractor and a detection head, and
wherein the training of the interim first NN model comprises training the feature vector extractor so that the cross-correlation loss is minimized.

5. The method of claim 1, wherein the training of the interim first NN model comprises performing unsupervised training of the interim first NN model without label information corresponding to the first input data.

6. The method of claim 1, further comprising:
obtaining a first additional feature vector by augmenting data of the first feature vector;
obtaining a second additional feature vector by augmenting data of the second feature vector;
obtaining a first target feature vector by concatenating the first feature vector with the first additional feature vector; and
obtaining a second target feature vector by concatenating the second feature vector with the second additional feature vector,
wherein the determining of the cross-correlation loss comprises determining the cross-correlation loss by comparing the first target feature vector with the second target feature vector.

7. The method of claim 6,
wherein the obtaining of the first additional feature vector comprises obtaining the first additional feature vector by applying at least one of a dropout layer, in the interim first NN model, or random Gaussian noise to the first feature vector, and
wherein the obtaining of the second additional feature vector comprises obtaining the second additional feature vector through use of at least one of a dropout layer, of the second NN model, or through application of random Gaussian noise to the second feature vector.

8. The method of claim 1, further comprising:
obtaining first additional input data by augmenting data of the first input data;
obtaining a first additional feature vector by inputting the first additional input data to the interim first NN model;
obtaining second additional input data by augmenting data of the second input data;

obtaining a second additional feature vector by inputting the second additional input data to the second NN model;

obtaining a first target feature vector by concatenating the first feature vector with the first additional feature vector; and obtaining a second target feature vector by concatenating the second feature vector with the second additional feature vector, wherein the determining of the cross-correlation loss comprises determining the cross-correlation loss by comparing the first target feature vector with the second target feature vector.

9. An electronic device comprising:

one or more processors configured to execute instructions; and one or more memories storing the instructions, wherein the execution of the instructions by the one or more processors configures the one or more processors to:

generate a cross-correlation loss based on a first feature vector, generated using an interim first neural network (NN) model provided an input based on first input data about a target object, and a second feature vector generated using a trained second NN model provided another input based on second input data about the target object; and generate a trained first NN model, including training the interim first NN model based on the cross-correlation loss, wherein, for the generating of the cross-correlation loss, the one or more processors are configured to:

determine a first cross-correlation loss based on a similarity of direction information between the first feature vector and the second feature vector;

determine a second cross-correlation loss based on a similarity of size information between the first feature vector and the second feature vector; and determine the cross-correlation loss by weighted-summing the first cross-correlation loss and the second cross-correlation loss.

10. The electronic device of claim 9, wherein the first input data comprises at least one image of the target object captured by a camera, and wherein the second input data comprises at least one of point cloud data of the target object obtained from a lidar sensor or multi-modal data obtained from a plurality of modalities.

11. The electronic device of claim 10, wherein the electronic device is vehicle, and the electronic device further comprises the camera and the lidar sensor.

12. The electronic device of claim 9, wherein the interim first NN model comprises a feature vector extractor and a detection head, and wherein, for the training of the interim first NN model, the one or more processors are configured to train the feature vector extractor toward minimization of the cross-correlation loss.

13. The electronic device of claim 9, wherein, for the training of the interim first NN model, the one or more processors are configured to perform unsupervised training of the interim first NN model without label information corresponding to the first input data.

14. The electronic device of claim 9, wherein the one or more processors are further configured to:

obtain a first additional feature vector by augmenting data of the first feature vector;

obtain a second additional feature vector by augmenting data of the second feature vector;

obtain a first target feature vector by concatenating the first feature vector with the first additional feature vector; and obtain a second target feature vector by concatenating the second feature vector with the second additional feature vector, and wherein, for the generation of the cross-correlation loss, the one or more processors are configured to determine the cross-correlation loss by comparing the first target feature vector with the second target feature vector.

15. The electronic device of claim 14, wherein the one or more processors are further configured to:

obtain the first additional feature vector by applying at least one of a dropout layer, in the interim first NN model, or random Gaussian noise to the first feature vector; and obtain the second additional feature vector by applying at least one of a dropout layer, of the second NN model, or through application of random Gaussian noise to the second feature vector.

16. The electronic device of claim 9, wherein the one or more processors are further configured to:

obtain first additional input data by augmenting data of the first input data;

obtain a first additional feature vector by inputting the first additional input data to the interim first NN model;

obtain second additional input data by augmenting data of the second input data;

obtain a second additional feature vector by inputting the second additional input data to the second NN model;

obtain a first target feature vector by concatenating the first feature vector with the first additional feature vector; and obtain a second target feature vector by concatenating the second feature vector with the second additional feature vector, wherein, further generation of the cross-correlation loss, the one or more processors are configured to determine the cross-correlation loss by comparing the first target feature vector with the second target feature vector.

17. An electronic device comprising:

one or more sensors;

one or more processors configured to execute instructions; and one or more memories storing the instructions, wherein the execution of the instructions by the one or more processors configures the one or more processors to:

estimate the target object based on at least one image captured by an image sensor of the one or more sensors;

obtain a first feature vector by inputting the at least one image to a feature vector extractor of a first neural network (NN) model; and estimate the target object by inputting the first feature vector to a detection head of the first NN model, wherein the first NN model is a NN model having been trained based on a second NN model that was trained based on a modality different from the image sensor, wherein the first NN model includes a camera-based three-dimensional (3D) object estimation detector, and wherein the camera-based 3D object estimation detector is configured to estimate 3D location/posture and classification information of the target object using a feature extraction network model that estimates 3D geometric information of the target object around an adjacent object from the at least one image obtained from the one or more sensors.

18. The electronic device of claim 17, wherein the second NN model includes at least one of a lidar modal-based 3D object estimation detector or a multi-modal based 3D object estimation detector, wherein the lidar modal-based 3D object estimation detector is configured to estimate 3D location information of the target object using point cloud data, and wherein the multi-modal based 3D object estimation detector is configured to estimate the 3D location information of the target object using the one or more sensors.

\*   \*   \*   \*   \*